United States Patent
Yamada

(10) Patent No.: US 7,063,081 B2
(45) Date of Patent: Jun. 20, 2006

(54) DETERIORATION DETERMINING APPARATUS AND DETERIORATION DETERMINING METHOD FOR OXYGEN SENSOR

(75) Inventor: Kazuhiro Yamada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 78 days.

(21) Appl. No.: 10/792,800

(22) Filed: Mar. 5, 2004

(65) Prior Publication Data

US 2004/0182379 A1 Sep. 23, 2004

(30) Foreign Application Priority Data

Mar. 19, 2003 (JP) ............................ 2003-076625

(51) Int. Cl.
 *F02B 63/00* (2006.01)
(52) U.S. Cl. .................. 123/688; 701/107; 701/109
(58) Field of Classification Search ................ 123/688, 123/690, 696, 694, 672; 701/103, 107, 109
 See application file for complete search history.

(56) References Cited

U.S. PATENT DOCUMENTS 5,396,765 A * 3/1995 Maruyama et al. ........... 60/276

FOREIGN PATENT DOCUMENTS

| JP | A 4-350345 | 12/1992 |
| JP | A 6-50200 | 2/1994 |
| JP | A 8-101161 | 4/1996 |
| JP | A 11-166438 | 6/1999 |

* cited by examiner

Primary Examiner—Henry C. Yuen
Assistant Examiner—Arnold Castro
(74) Attorney, Agent, or Firm—Oliff & Berridge, PLC

(57) ABSTRACT

A deterioration determining apparatus and a deterioration determining method are applied to an engine in which a feedback control of an air-fuel ratio is performed by calculating an air-fuel ratio correction coefficient based on an output of an oxygen sensor, and response of the air-fuel ratio correction coefficient with respect to the output of the oxygen sensor is set so as to be variable. In the deterioration determining apparatus and the deterioration determining method, a deterioration determining value concerning a determination as to whether the oxygen sensor has deteriorated is set so as to be variable according to the set response of the air-fuel ratio correction coefficient with respect to the output of the oxygen sensor, and the determination as to whether the oxygen sensor has deteriorated is made based on an inversion cycle of the output of the oxygen sensor and the deterioration determining value.

12 Claims, 10 Drawing Sheets

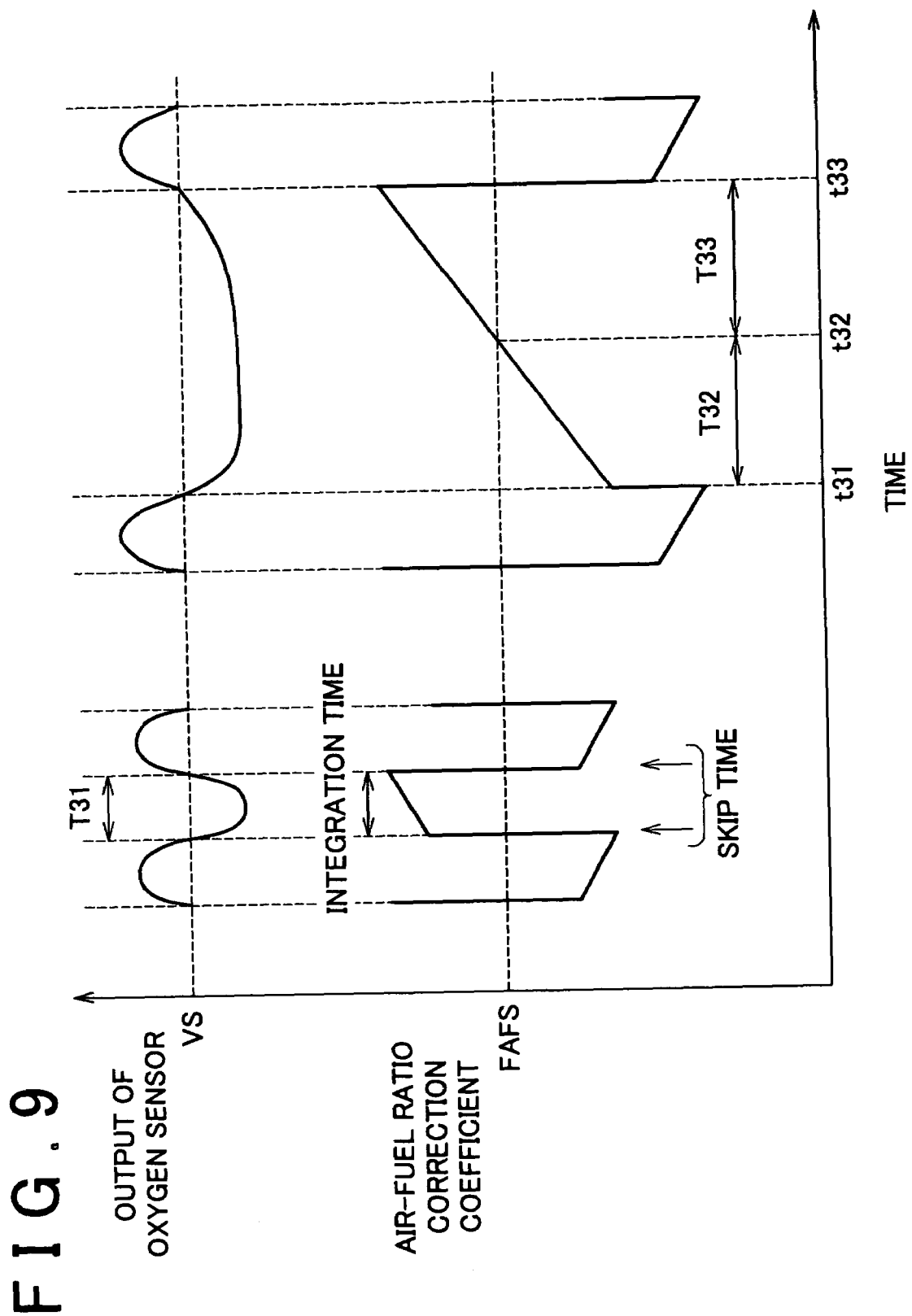

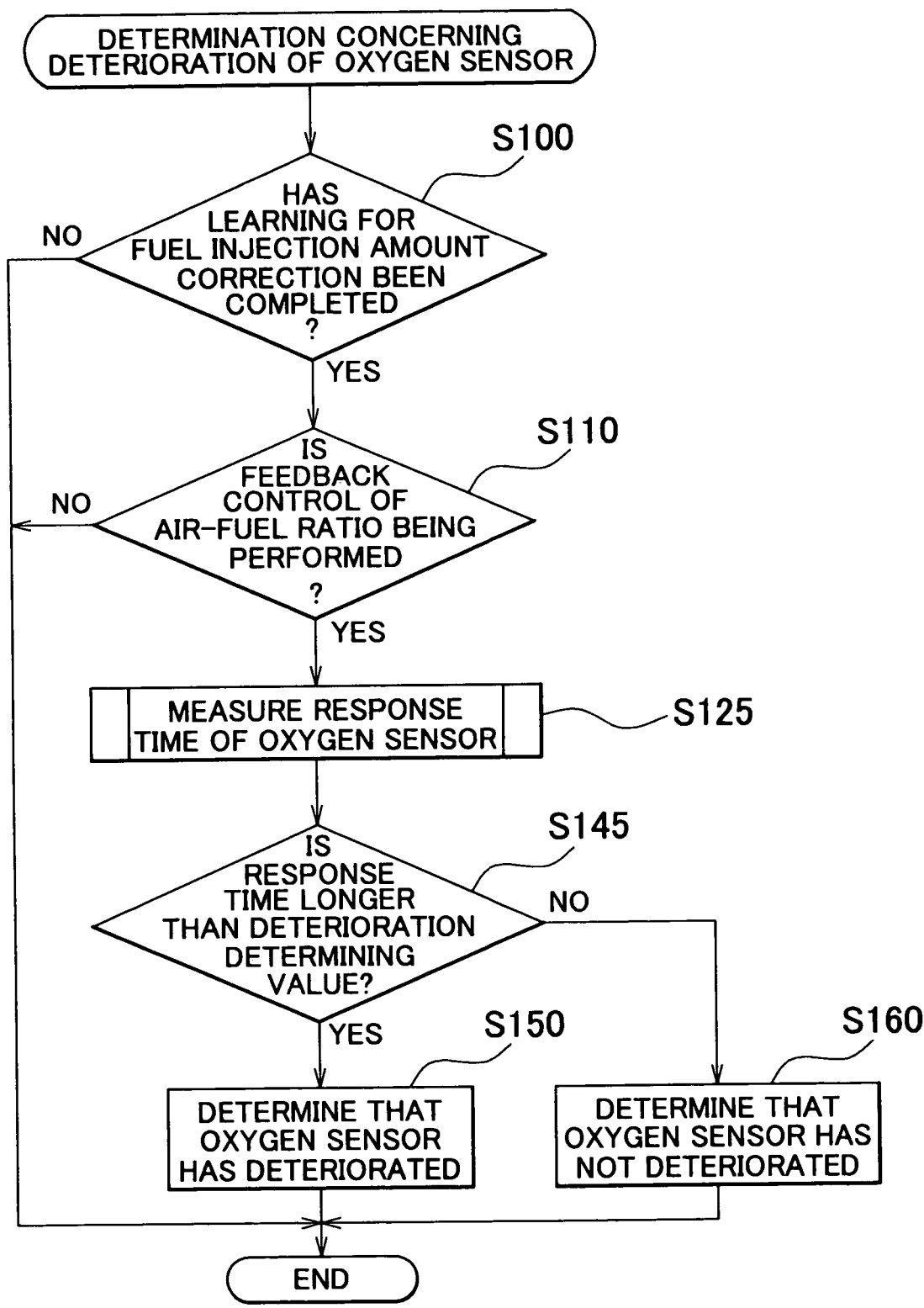

DETERIORATION DETERMINING APPARATUS AND DETERIORATION DETERMINING METHOD FOR OXYGEN SENSOR

INCORPORATION BY REFERENCE

The disclosure of Japanese Patent Application No. 2003-076625 filed on Mar. 19, 2003, including the specification, drawings and abstract is incorporated herein by reference in its entirety.

BACKGROUND OF THE INVENTION

1. Field of the Invention

The invention relates to an apparatus and a method which determine whether an oxygen sensor has deteriorated, and which are applied to an engine in which a feedback control of an air-fuel ratio is performed by calculating an air-fuel ratio correction coefficient based on an output of the oxygen sensor.

2. Description of the Related Art

As is generally known, an oxygen sensor that detects an oxygen concentration of exhaust gas is provided in an exhaust system, and a feedback control of an air-fuel ratio is performed based on an output of the oxygen sensor in many types of engines. In such engines, when it is detected that the air-fuel ratio is richer than a target air-fuel ratio based on the output of the oxygen sensor, a decrease correction of a fuel injection amount is performed. When it is detected that the air-fuel ratio is leaner than the air-fuel ratio based on the output of the oxygen sensor, an increase correction of the fuel injection amount is performed. Thus, the air fuel ratio is controlled to the target air-fuel ratio. The correction of the fuel injection amount is generally performed using a skip correction and an integral correction. In the skip correction, the air-fuel ratio correction coefficient is increased or decreased by a predetermined amount at one time when it is detected, based on the output of the oxygen sensor, that the air-fuel ratio changes from lean to rich or rich to lean. In the integral correction, the air-fuel ratio correction coefficient is gradually increased or decreased during a period in which the output of the oxygen sensor shows that the air-fuel ratio is lean or rich.

The characteristics of the oxygen sensor used for such a feedback control of the air-fuel ratio, such as internal resistance, electromotive force, and response time, may change due to thermal deterioration or the like, and the accuracy of the air-fuel ratio control may decrease due to the change in the characteristics. Therefore, in most of the engines in which the aforementioned feedback control of the air-fuel ratio is performed, a determination as to whether the oxygen sensor has deteriorated is made in order to prevent such deterioration of the accuracy.

Conventionally, the determination concerning deterioration of the oxygen sensor is made by determining that response has deteriorated when an inversion cycle of the output of the oxygen sensor is equal to or longer than a deterioration determining value, as disclosed by Japanese Patent Laid-Open Publication No. 6-50200. The inversion cycle of the output of the oxygen sensor indicates both a time period from when the output of the oxygen sensor becomes lean until when the output becomes rich, and a time period from when the output becomes rich until when the output becomes lean.

Japanese Patent Laid-Open Publication No. 11-166438 proposes a deterioration determining apparatus for an oxygen sensor in which a deterioration determining value is set so as to be variable according to an integrated value of an intake air amount when a determination concerning deterioration of the oxygen sensor is made based on an inversion cycle of the oxygen sensor. In the deterioration determining apparatus, the determination concerning deterioration of the oxygen sensor can be appropriately made, irrespective of a change in the inversion cycle of the oxygen sensor due to a change in a flow speed of intake air and exhaust gas according to the intake air amount.

In the feedback control of the air-fuel ratio, the response of the aforementioned air-fuel ratio correction coefficient with respect to the lean-rich inversion of the output of the oxygen sensor may be set so as to be variable according to a situation. The response of the air-fuel ratio correction coefficient is set so as to be variable by changing an integral correction amount or a skip correction amount. The integral correction amount is an increase/decrease rate of the air-fuel ratio correction coefficient at the time of the aforementioned integral correction. The skip correction amount is an increase/decrease amount of the air-fuel ratio correction coefficient at the time of the aforementioned skip correction. For example, when the integral correction amount or the skip correction amount is decreased, a degree of change in the air-fuel ratio correction coefficient in response to the lean-rich inversion of the output of the oxygen sensor decreases, and the response of the air-fuel ratio correction coefficient decreases.

Also, the feedback center of the air-fuel ratio correction coefficient may be adjusted by setting the integral correction amounts of the air-fuel ratio correction coefficient at the time of rich air-fuel ratio and at the time of lean air-fuel ratio to different values, or setting the skip correction amounts at the time of rich air-fuel ratio and at the time of lean air-fuel ratio to different values so that the response of the air-fuel ratio correction coefficient at the time of rich air-fuel ratio becomes different from the response at the time of lean air-fuel ratio. For example, when the response of the air-fuel ratio correction coefficient at the time of rich air-fuel ratio is made lower than the response at the time of lean air-fuel ratio by decreasing the skip correction amount when the output of the oxygen sensor is inverted from lean to rich, or the integral correction amount when the output of the oxygen sensor is rich, the feedback center of the air-fuel ratio correction coefficient is deviated to the rich side with respect to a value corresponding to the target air-fuel ratio.

Thus, when the response of the air-fuel ratio correction coefficient is changed, the inversion cycle of the output of the oxygen sensor is changed, irrespective of the response of the oxygen sensor itself. For example, when the integral correction amount or the skip correction amount is decreased so that the response of the air-fuel ratio correction coefficient is decreased, the inversion cycle of the output of the oxygen sensor is increased even if the response of the oxygen sensor itself is good.

The inversion cycle of the output of the oxygen sensor is changed according to the set response of the air-fuel ratio correction coefficient, in addition to deterioration of the oxygen sensor and the intake air amount. However, in the aforementioned conventional determination mode, it is not possible to appropriately cope with the change in the inversion cycle due to the response of the air-fuel ratio correction coefficient, and therefore a wrong determination may be made.

SUMMARY OF THE INVENTION

In view of the above, it is an object of the invention to provide a deterioration determining apparatus for an oxygen sensor which can make a determination concerning deterioration of an oxygen sensor more appropriately.

An aspect of the invention relates to a deterioration determining apparatus and a deterioration determining method, which are applied to an engine in which a feedback control of an air-fuel ratio is performed by calculating an air-fuel ratio correction coefficient based on an output of an oxygen sensor, and response of the air-fuel ratio correction coefficient with respect to the output of the oxygen sensor is set so as to be variable. In the deterioration determining apparatus and the deterioration determining method, a deterioration determining value concerning a determination as to whether the oxygen sensor has deteriorated is set so as to be variable according to the set response of the air-fuel ratio correction coefficient with respect to the output of the oxygen sensor, and the determination as to whether the oxygen sensor has deteriorated is made based on an inversion cycle of the output of the oxygen sensor and the deterioration determining value.

In the aforementioned deterioration determining apparatus and the deterioration determining method, when the response of the air-fuel ratio correction coefficient with respect to the output of the oxygen sensor is changed, the deterioration determining value is accordingly changed. Thus, it is possible to appropriately adjust the deterioration determining value according to a change in an inversion cycle of the output of the oxygen sensor due to a change in the response of the air-fuel ratio correction coefficient. As a result, a determination concerning deterioration of the oxygen sensor can be made more appropriately.

Another aspect of the invention relates to a deterioration determining apparatus and a deterioration determining method, which are applied to an engine in which a feedback control of an air-fuel ratio is performed by calculating an air-fuel ratio correction coefficient based on an output of an oxygen sensor, and a feedback center of the air-fuel ratio correction coefficient is adjusted by making response of the air-fuel ratio correction coefficient with respect to the output of the oxygen sensor different between when it is detected that the air-fuel ratio is richer than a target air-fuel ratio based on the output of the oxygen sensor, and when it is detected that the air-fuel ratio is leaner than the target air-fuel ratio based on the output of the oxygen sensor. In the deterioration determining apparatus and the deterioration determining method, a deterioration determining value concerning a determination as to whether the oxygen sensor has deteriorated is set so as to be variable according to a degree of adjustment of the feedback center of the air-fuel ratio correction coefficient, and the determination as to whether the oxygen sensor has deteriorated is made based on an inversion cycle of the output of the oxygen sensor and the deterioration determining value.

In the aforementioned deterioration determining apparatus and the deterioration determining method, the feedback center of the air-fuel ratio correction coefficient can be adjusted by making the response of the air-fuel ratio correction coefficient with respect to the output of the oxygen sensor different between when it is detected that the air-fuel ratio is richer than the target air-fuel ratio based on the output of the oxygen sensor, and when it is detected that the air-fuel ratio is leaner than the target air-fuel ratio based on the output of the oxygen sensor. By adjusting the feedback center in this manner, a ratio between a period in which the oxygen sensor outputs a detection result showing that the air-fuel ratio is richer than the target air-fuel ratio (a rich period), and a period in which the oxygen sensor outputs a detection result showing that the air-fuel ratio is leaner than the target air-fuel ratio (a lean period) is changed. The inversion cycle of the output of the oxygen sensor is accordingly changed.

In the aforementioned configuration, since the deterioration determining value is set so as to be variable according to the degree of adjustment of the feedback center, it is possible to appropriately adjust the deterioration determining value according to a change in the inversion cycle of the output of the oxygen sensor due to the adjustment. Thus, the determination concerning deterioration of the oxygen sensor can be made more appropriately.

A further aspect of the invention relates to a deterioration determining apparatus and a deterioration determining method for an oxygen sensor, which are applied to an engine in which a feedback control of an air-fuel ratio by calculating an air-fuel ratio correction coefficient based on an output of an oxygen sensor. In the deterioration determining apparatus and the deterioration determining method for an oxygen sensor, a time period is measured from when the air-fuel ratio correction coefficient is changed so as to cross a value corresponding to a target air-fuel ratio in the feedback control of the air-fuel ratio until when it is detected, based on the output of the oxygen sensor, that the air-fuel ratio has changed from a value richer than the target air-fuel ratio to a value leaner than the target air-fuel ratio, or from a value leaner than the target air-fuel ratio to a value richer than the target air-fuel ratio, and a determination as to whether the oxygen sensor has deteriorated is made based on the measured time period.

A learning control in which an air-fuel ratio learning value is learned based on a change in the air-fuel ratio correction coefficient may be performed together with the feedback control of the air-fuel ratio. In such a learning control, if the air-fuel ratio learning value is appropriately learned, the value corresponding to the target air-fuel ratio in the feedback control of the air-fuel ratio can be obtained.

In the aforementioned deterioration determining apparatus and the deterioration determining method, since the value corresponding to the target air-fuel ratio is obtained, it can be presumed that the actual air-fuel ratio changes from lean to rich or from rich to lean when the air-fuel ratio correction coefficient is changed so as to cross the value corresponding to the target air-fuel ratio. Also, it can be estimated that a time period from when the air-fuel ratio correction coefficient is changed so as to cross the value corresponding to the target air-fuel ratio until when the output of the oxygen sensor is inverted from lean to rich or from rich to lean is a response delay time of the oxygen sensor.

Meanwhile, when the feedback center of the air-fuel ratio correction coefficient is deviated from the value corresponding to the target air-fuel ratio, the rich period and the lean period of the oxygen sensor become unbalanced, and the inversion cycle is changed. In the aforementioned configuration, the determination concerning deterioration of the oxygen sensor is made based on the response delay time of the oxygen sensor excluding influence of the deviation of the feedback center on the inversion cycle. Therefore, the determination concerning deterioration of the oxygen sensor can be made more appropriately.

BRIEF DESCRIPTION OF THE DRAWINGS

The above mentioned and other objects, features, advantages, technical and industrial significance of this invention will be better understood by reading the following detailed description of preferred embodiments of the invention, when considered in connection with the accompanying drawings, in which:

FIG. 9 is a timing chart showing an output of the oxygen sensor and a change in an air-fuel ratio correction coefficient; and FIG. 10 is a flowchart showing a procedure for making a determination concerning deterioration of the oxygen sensor according to the third embodiment of the invention.

DETAILED DESCRIPTION OF THE PREFERRED EMBODIMENTS

In the following description and the accompanying drawings, the present invention will be described in more detail with reference to exemplary embodiments.

First Embodiment

Hereinafter, a deterioration determining apparatus for an oxygen sensor according to a first embodiment of the invention will be described with reference to FIG. 1 to FIG. 5.

Figure 1:
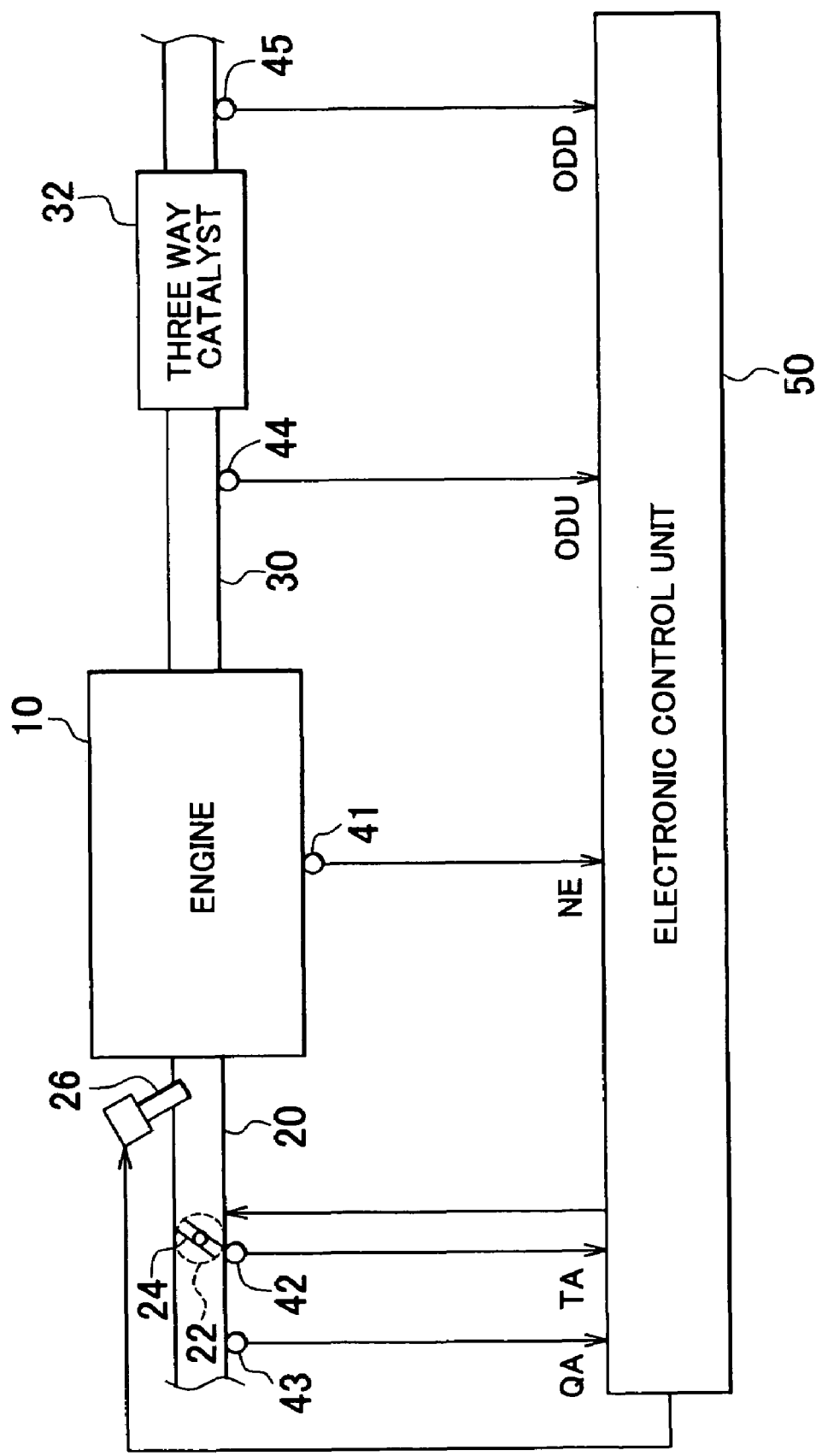
FIG. 1 is a block diagram showing an outline of a deterioration determining apparatus for an oxygen sensor according to a first embodiment to a third embodiment of the invention.

FIG. 1 shows an outline of a deterioration determining apparatus for an oxygen sensor according to the embodiment of the invention and an engine for a vehicle and the like to which the apparatus is applied. As shown in FIG. 1, an intake passage 20 is connected to an engine 10. A throttle valve 24 which is driven to be opened/closed by a throttle motor 22 is provided in the intake passage 20. An amount of intake air supplied to the engine 10 through the intake passage 20 is adjusted based on an opening of the throttle valve 24. An injector 26 which injects fuel is provided in the intake passage 20 at a portion in the vicinity of the engine 10.

A three way catalyst 32 is provided in an exhaust passage 30 which is connected to the engine 10. The three way catalyst purifies hydrocarbon (HC), carbon monoxide (CO), and NOx (nitrogen oxide).

Further, various sensors for detecting an operating state of the engine 10 are provided in the engine 10. For example, an engine speed sensor 41 which detects an engine speed signal NE is provided in the engine 10 at a portion in the vicinity of a crankshaft. Also, a throttle sensor 42, which detects a throttle valve opening TA so that the throttle valve opening TA is controlled to a target opening through feedback, is provided at a portion in the vicinity of the throttle valve 24. Further, an air flow meter 43 is provided upstream of the throttle valve 24. The air flow meter 43 detects an intake air amount QA that is an amount of intake air passing through the intake passage 20. An upstream-side oxygen sensor 44 which detects an oxygen concentration signal ODU is provided upstream of the three way catalyst 32 in the exhaust passage 30, and a downstream-side oxygen sensor 45 which detects an oxygen concentration signal ODD is provided downstream of the three way catalyst 32 in the exhaust passage 30. Detection signals from these various sensors 41 to 45 are input to an electronic control unit 50 which performs various controls of the engine.

The electronic control unit 50 includes a central processing unit (CPU), various control programs, a map for computations, and a memory which stores data calculated when the controls are performed, and the like. The electronic control unit 50 performs a feedback control of an air-fuel ratio according to an oxygen concentration of exhaust gas, an engine speed control during idling operation, and the like, based on the operating state of the engine 10 detected by the various sensors 41 to 45.

In the engine 10 according to the embodiment of the invention, the electronic control unit 50 calculates a fuel injection time "τ fin" that is a time period in which fuel is injected by the injector 26, using the following equation (1).

$$\tau fin = \tau base + KG + FAF \tag{1}$$

In the aforementioned equation (1), "τ base" is a basic fuel injection time. More specifically, the basic fuel injection time τ base is decided based on the engine speed and the intake air amount QA such that the air-fuel ratio which is a mixture ratio between intake air and fuel becomes equal to a stoichiometric air-fuel ratio.

Also, "KG" is a learning correction amount of the fuel injection time, and is set according to the operating state of the engine 10 such that the air-fuel ratio becomes equal to the stoichiometric air-fuel ratio. That is, after completing the learning for correcting the fuel injection amount (fuel injection time), the feedback center in the feedback control of the air-fuel ratio basically matches a value corresponding to the stoichiometric air-fuel ratio. The learning for the correction of the fuel injection amount is performed for each of engine operation regions which are decided according to an engine load and the like.

"FAF" is an air-fuel ratio correction coefficient calculated based on the output of the aforementioned oxygen sensors 44 and 45. The air-fuel ratio correction coefficient FAF is set based on the outputs of the oxygen sensors 44 and 45 such that the air-fuel ratio of the air-fuel mixture supplied to the engine 10 matches the target air-fuel ratio during the feedback control of the air-fuel ratio. More specifically, the air-fuel ratio correction coefficient FAF is repeatedly set, using the following equation (2).

$$FAF \to FAF + RS + KI \quad (2)$$

"RS" in the aforementioned equation (2) is a skip correction amount. The skip correction amount RS is set to a predetermined negative value−Rd (Rd>0) when the output of the upstream side oxygen sensor 44 shows that the air-fuel ratio changes from lean to rich. The skip correction amount RS is set to a predetermined positive value+Ri (Ri>0) when the output of the upstream side oxygen sensor 44 shows that the air-fuel ratio changes from rich to lean. Thus, when the output of the upstream side oxygen sensor 44 is inverted from lean to rich or from rich to lean, the air-fuel ratio correction coefficient FAF is increased or decreased at one time.

Each of the aforementioned values Rd, Ri is adjusted so that the overall air-fuel ratio becomes equal to the stoichiometric air-fuel ratio, according to whether the air-fuel ratio detected based on the oxygen concentration signal ODD from the downstream side oxygen sensor 45 is leaner or richer than the stoichiometric air-fuel ratio. More specifically, when it is detected, based on the output of the downstream side oxygen sensor 45, that the overall air-fuel ratio is leaner than the stoichiometric air-fuel ratio, the value Ri is increased so as to be larger than the value Rd, and the period in which the air-fuel ratio is rich (the rich period) is made longer than the period in which the air-fuel ratio is lean (the lean period). Also, when it is detected, based on the output of the downstream side oxygen sensor 45, that the overall air-fuel ratio is richer than the stoichiometric air-fuel ratio, the value Rd is increased so as to be larger than the value Ri, and the lean period is made longer than the rich period. That is, since the set value (the value Ri) of the skip correction amount RS at the time of increase correction and the set value (Rd) of the skip correction amount RS at the time of decrease correction are made asymmetric, deviation of the overall air-fuel ratio from the stoichiometric air-fuel ratio is compensated.

"KI" of the aforementioned equation (2) is an integral correction amount. The integral correction amount KI is set to a predetermined negative value−Kd (Kd>0) while the upstream side oxygen sensor 44 outputs a signal showing that the air-fuel ratio is rich. The integral correction amount KI is set to a predetermined positive value+Ki (Ki >0) while the upstream side oxygen sensor 44 outputs a signal showing that the air-fuel ratio is lean. Thus, the air-fuel ratio correction coefficient FAF is decreased by the value Kd every predetermined time while it is shown that the air-fuel ratio is rich. The air-fuel ratio correction coefficient FAF is increased by the value Ki every predetermined time while it is shown that the air-fuel ratio is lean. Accordingly, as the values Kd, Ki are increased, the speed at which the fuel injection time τ fin is changed, that is, the speed at which the fuel injection amount is changed is increased.

Each of the aforementioned values Kd, Ki is set so as to be variable according to the intake air amount QA and the like. Thus, the air-fuel ratio control is adjusted based on a change in the response of the oxygen sensor 44 according to the intake air amount QA. That is, when the intake air amount QA is small, the flow rate of the exhaust gas decreases, and much time is required until when a change in the actual air-fuel ratio is reflected in the output of the oxygen sensor 44. Therefore, if the speed at which the fuel injection amount is changed is set to an extremely high value during the feedback control of the air-fuel ratio when the intake air amount QA is small, a large change in the air-fuel ratio occurs due to excessive correction. Accordingly, when the intake air amount QA is small, each of the aforementioned values Kd, Ki is set to a small value, whereby the large change in the air-fuel ratio is suppressed.

Hereinafter, a determination concerning deterioration of the oxygen sensor according to the embodiment of the invention will be described with reference to FIG. 2 to FIG. 5. According to the embodiment of the invention, a determination concerning deterioration of the oxygen sensor is made by measuring the inversion cycle of the output of the upstream side oxygen sensor 44, and determining that the oxygen sensor 44 has deteriorated when the measured inversion cycle is longer than a predetermined deterioration determining value. The inversion cycle of the output of the oxygen sensor 44 is measured according to the procedure shown in FIG. 2.

Figure 2:
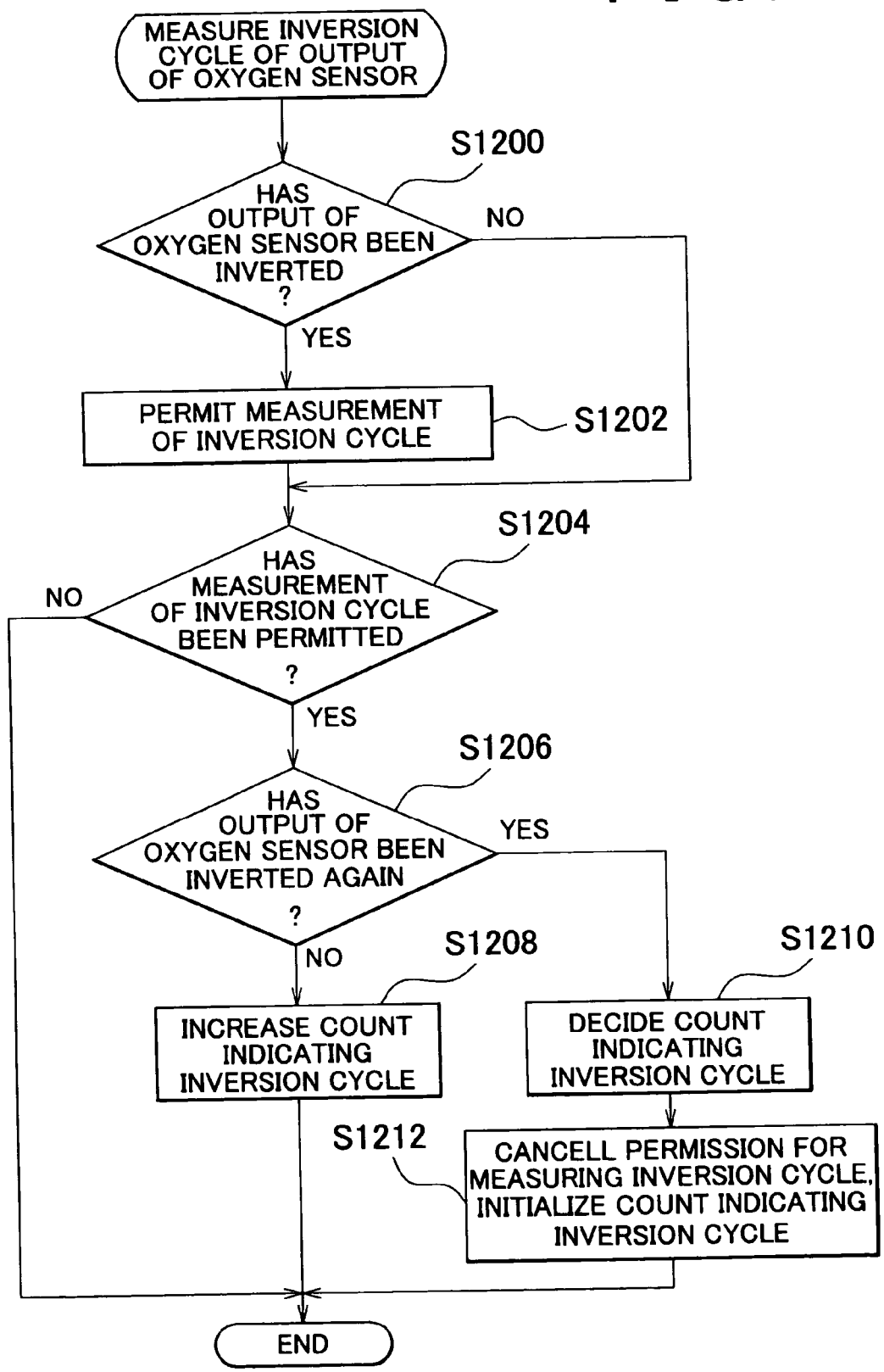
FIG. 2 is a flowchart showing a procedure for measuring an inversion cycle of an output of an oxygen sensor according to the first embodiment and the second embodiment of the invention.

In a series of processes shown in FIG. 2, it is determined whether or not the output of the oxygen sensor has been inverted (step 1200). More specifically, it is determined whether or not the output of the oxygen sensor 44 has been inverted from lean to rich or from rich to lean. That is, since the inversion cycle of the output of the oxygen sensor 44 starts to be measured at the time at which the output of the oxygen sensor 44 is inverted, it is determined whether or not the output thereof has been inverted.

If it is determined that the output of the oxygen sensor has been inverted (i.e., YES in step 1200), the measurement of the inversion cycle of the output of the oxygen sensor is permitted (step 1202). More specifically, a flag FOR indicating the result of the aforementioned determination is set to "1". That is, since the output of the oxygen sensor 44 has been inverted, the flag FOR indicates that a condition for starting the aforementioned measurement is satisfied.

Meanwhile, if it is determined that the output of the oxygen sensor has not been inverted (i.e., NO in step 1200), the aforementioned measurement is not permitted. More specifically, while the value of the flag FOR is maintained at "0", and the flag FOR indicates that the condition for starting the aforementioned measurement is not satisfied.

Subsequently, it is determined whether or not the measurement of the inversion cycle of the output of the oxygen sensor has been permitted (step 1204). More specifically, it is determined whether or not the flag FOR is set to "1". That is, it is determined whether or not the output of the oxygen sensor 44 has been inverted and the aforementioned measurement has been permitted (step 1202) or the measurement is being performed.

If it is determined that the measurement of the inversion cycle of the output of the oxygen sensor has not been permitted (i.e., NO in step 1204), the series of the processes is finished.

If it is determined that the measurement of the inversion cycle of the output of the oxygen sensor has been permitted (i.e., YES in step 1204), it is determined whether or not the output of the oxygen sensor has been inverted again (step 1206). More specifically, it is determined whether or not the output of the oxygen sensor 44 has been inverted from rich to lean or from lean to rich. That is, it is determined whether or not the output of the oxygen sensor 44 has been inverted again after the output of the oxygen sensor 44 was inverted once (step 1200), that is, whether or not one inversion cycle of the output of the oxygen sensor 44 on the rich side or on the lean side has been finished.

If it is determined that the output of the oxygen sensor has not been inverted again (i.e., NO in step 1206), the count indicating the inversion cycle is increased (step 1208). More specifically, a counter included in the electronic control unit 50 continues counting, whereby the inversion cycle TC1 of the output of the oxygen sensor 44, which is converted into the count number of the counter, is increased. That is, since the output of the oxygen sensor 44 has not been inverted again, and one inversion cycle on the rich side or on the lean side has not been finished, the measurement of the inversion cycle TC1 is continued. Thus, after the count indicating the inversion cycle of the output of the oxygen sensor 44 is increased, the series of processes is finished.

If it is determined that the output of the oxygen sensor has been inverted again (i.e., YES in step 1206), the count indicating the inversion cycle is decided (step 1210). More specifically, the counter finishes counting, and the inversion cycle TC1 of the output of the oxygen sensor 44, which is converted into the count number, is decided. That is, since the output of the oxygen sensor 44 has been inverted again, and the inversion cycle on the rich side or on the lean side has been finished, the measurement of the inversion cycle TC1 is finished.

After the count indicating the inversion cycle is decided, the permission for measuring the inversion cycle is cancelled, and the count of the inversion cycle is initialized (step 1212). More specifically, the flag FOR is set to "0", and the count number of the counter is reset to "0". Thus, the permission for measuring the inversion cycle is cancelled, and the count of the inversion cycle is initialized, afterwhich the series of processes is finished.

In the embodiment of the invention, the overall air-fuel ratio is adjusted by setting, to different values, the skip correction amounts RS when the air-fuel ratio changes from lean to rich and when the air-fuel ratio changes from rich to lean. When such adjustment is performed, the inversion cycle of the output of the oxygen sensor 44 increases, and therefore it may be wrongly determined that the oxygen sensor 44 has deteriorated although the response of the oxygen sensor 44 does not decrease. Hereinafter, the reason why such a wrong determination may be made will be described with reference to FIG. 3.

First, description will be made of a case where the skip correction amount RS at the time of increase correction and the skip correction amount RS at the time of decrease correction are symmetric, that is, a case where the feedback center of the feedback control of the air-fuel ratio matches a value corresponding to the stoichiometric air-fuel ratio (hereinafter, referred to as "stoichiometric corresponding value") FAFS (a case where the degree of adjustment of the feedback center (hereinafter referred to as "feedback center adjustment degree") CA is "0".)

As shown in a left side of a graph in FIG. 3, when the oxygen concentration signal ODU detected by the oxygen sensor 44 changes from rich to lean or from lean to rich so as to cross a value equivalent to the stoichiometric air-fuel ratio (hereinafter, referred to as "stoichiometric equivalent value") VS (i.e., the output of the oxygen sensor is inverted), the skip correction amount RS is added to the air-fuel ratio correction coefficient FAF (at a skip time). Therefore, the value of the air-fuel ratio correction coefficient FAF greatly changes from the value for increase correction to the value for decrease correction, or from the value for decrease correction to the value for increase correction so as to cross the stoichiometric corresponding value FAFS. As a result, the oxygen concentration signal ODU sharply changes from rich to lean or from lean to rich. At this time, for example a time period T11 is measured for determining the inversion cycle TC1 of the output of the oxygen sensor 44. After the skip correction amount RS is added, the air-fuel ratio correction coefficient FAF is gradually increased using the aforementioned integral correction amount KI.

Next, description will be made of a case where the skip correction amount RS at the time of increase correction and the skip correction amount RS at the time of decrease correction are asymmetric, that is, a case where the feedback center of the feedback control of the air-fuel ratio is deviated from the stoichiometric corresponding value FAFS (a case where the feedback center adjustment degree CA is not "0"). In the embodiment, the feedback center adjustment degree CA is represented by a deviation between the feedback center and the stoichiometric corresponding value FAFS when a medium value between a maximum value and a minimum value of the air-fuel ratio correction coefficient FAF is the feedback center (shown by a dashed line in FIG. 3).

Figure 3:
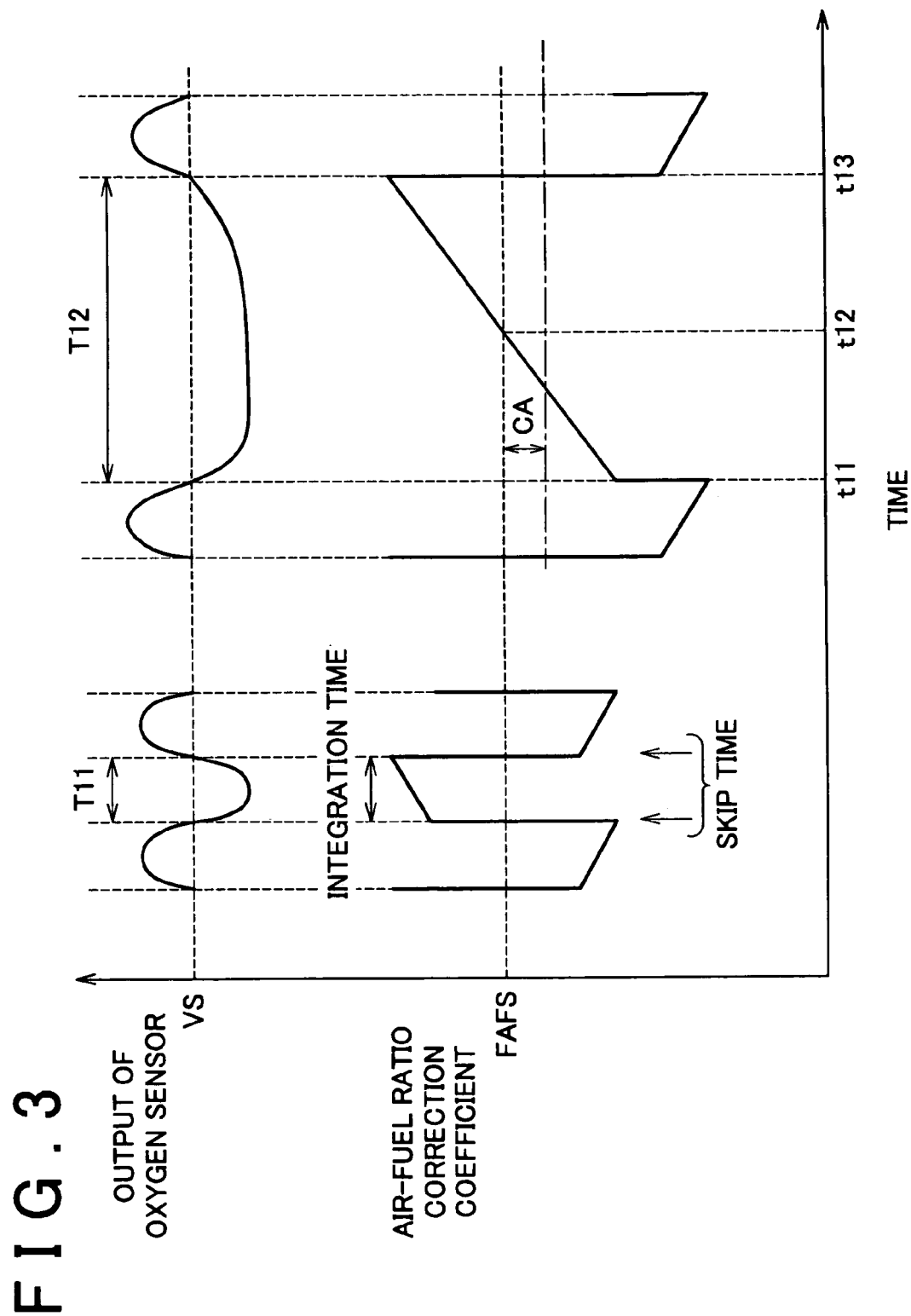
FIG. 3 is a timing chart showing the output of the oxygen sensor and a change in an air-fuel ratio correction coefficient according to the first embodiment and the second embodiment.

As shown in a right side of the graph in FIG. 3, when the oxygen concentration signal ODU changes from rich to lean so as to cross the stoichiometric corresponding value, the skip correction amount RS is added to the air-fuel ratio correction coefficient FAF. However, in the case where the feedback center adjustment degree CA that is based on the skip correction amount RS is large, the decrease correction may not be changed to the increase correction (at time t11) even when the output of the oxygen sensor 44 is inverted, and the skip correction amount RS is added to the air-fuel ratio correction coefficient FAF.

As a result, the decrease correction of the fuel injection amount continues. Therefore, the oxygen concentration signal ODU does not change from lean to rich. Then, the value of the air-fuel ratio correction coefficient FAF becomes equal to the stoichiometric corresponding value FAFS due to the integral correction amount KI (at time t12). Further, while the fuel injection amount is increased by the increase correction, the oxygen concentration signal ODU gradually changes from lean to rich (at time t13). At this time, for example, a time period T12 is measured for determining the inversion cycle TC1 of the output of the oxygen sensor 44.

Thus, the inversion cycle of the output of the oxygen sensor 44 varies according to the feedback center adjustment degree CA. As the feedback center adjustment degree CA is larger, the inversion cycle of the output of the oxygen sensor 44 varies to a larger extent. That is, as the feedback center adjustment degree CA is larger, the inversion cycle of the output of the oxygen sensor 44 tends to be longer. Therefore, as the feedback center adjustment degree CA is larger, there is a larger possibility that a wrong determination is made when making the determination concerning deterioration of the oxygen sensor 44 based on the inversion cycle.

Figure 4:
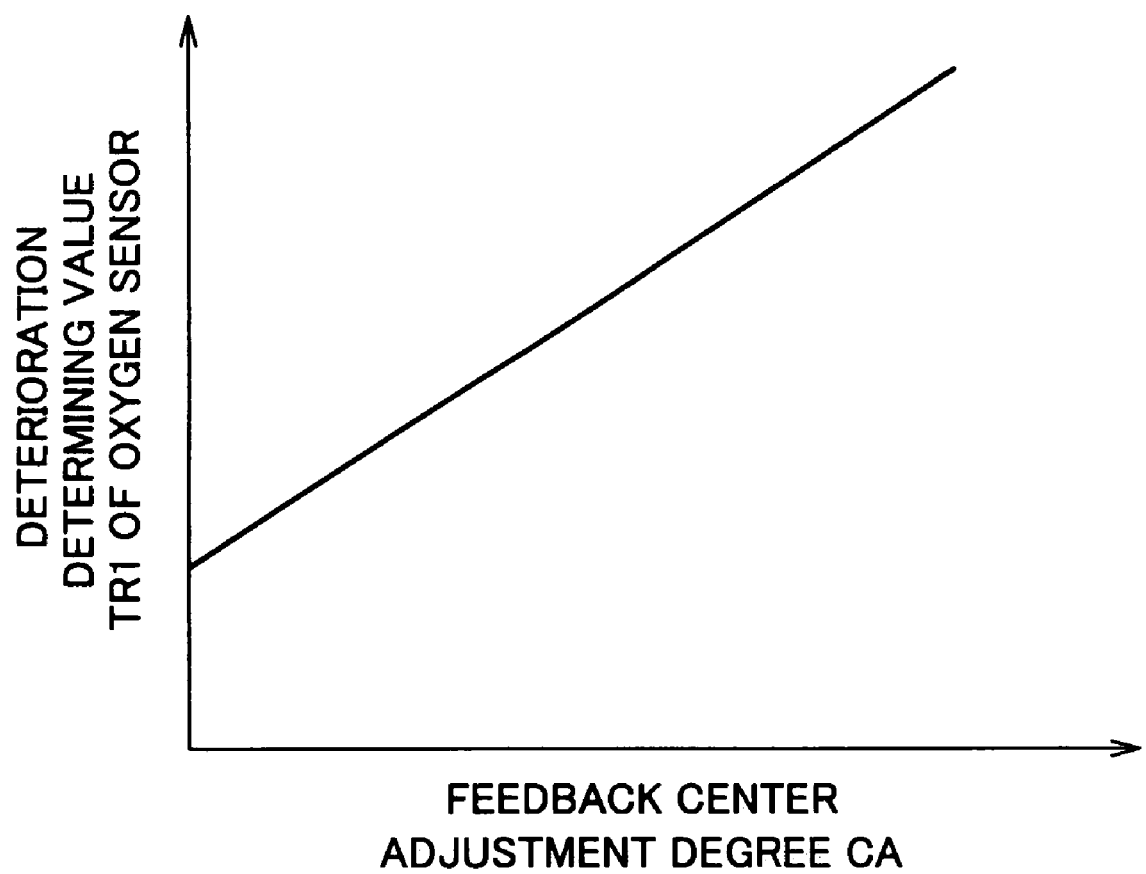
FIG. 4 is a map showing a relation between a degree of adjustment of a feedback center and a deterioration determining value for the oxygen sensor according to the first embodiment and the second embodiment.

Accordingly, in the embodiment, a deterioration determining value TR1 is set so as to be variable according to the feedback center adjustment degree CA, referring to the map shown in FIG. 4. As shown in the map in FIG. 4, the deterioration determining value TR1 is set to a larger value as the feedback center adjustment degree CA is larger. This is because, as the feedback center adjustment degree CA is larger, the inversion cycle of the output of the oxygen sensor 44 tends to be longer, as described above. Therefore, even when the feedback center adjustment degree CA increases and the inversion cycle of the output of the oxygen sensor 44 increases, the deterioration determining value TR1 is set to an appropriate value according to the increase in the feedback center adjustment degree CA and the increase in the inversion cycle of the output of the oxygen sensor 44.

Figure 5:
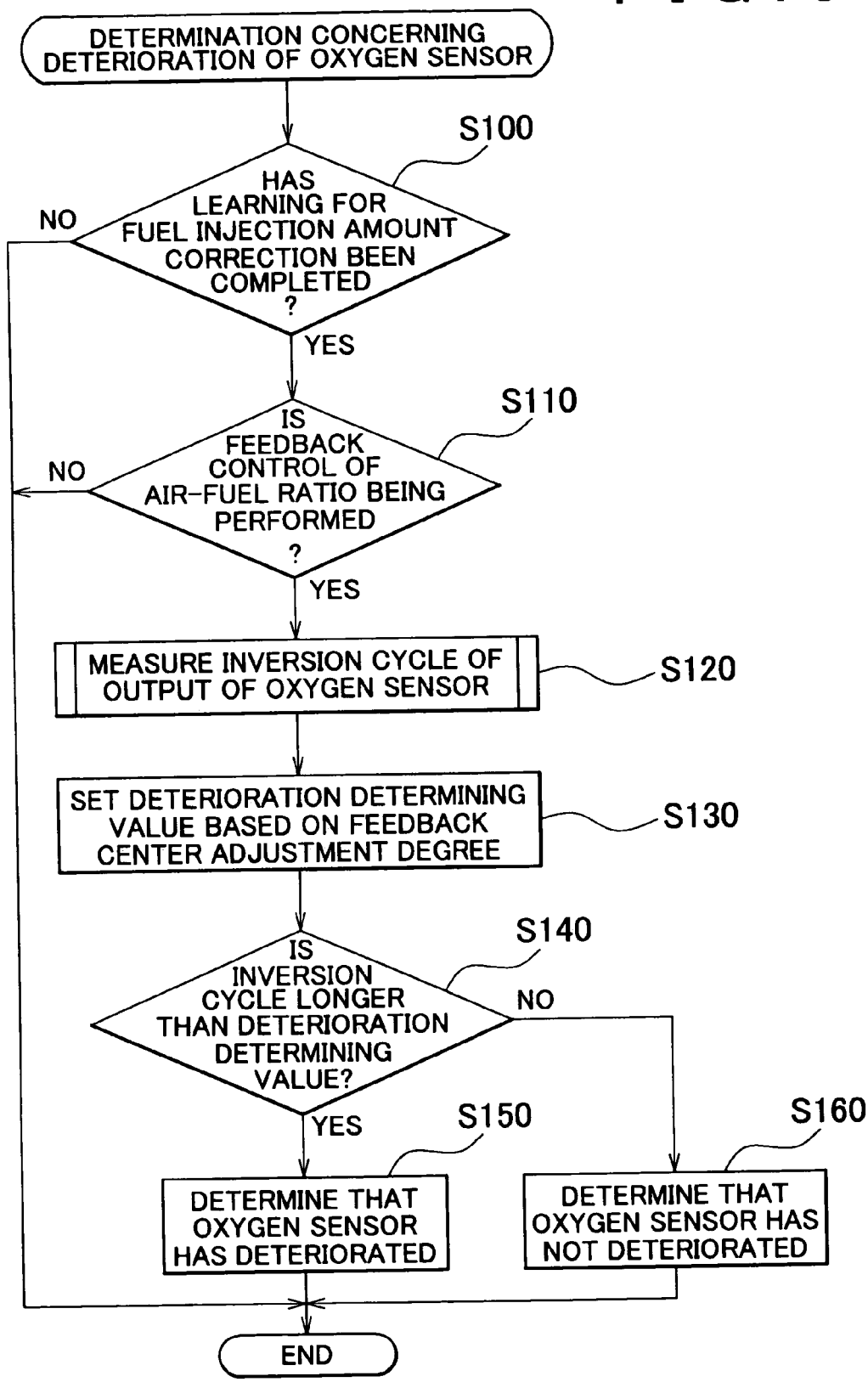
FIG. 5 is a flowchart showing a procedure for making a determination concerning deterioration of the oxygen sensor according to the first embodiment and the second embodiment of the invention.

FIG. 5 is a flowchart showing processes of a determination concerning deterioration of the oxygen sensor 44 according to the embodiment of the invention, which has been described above. The series of the processes shown in the flowchart is repeatedly performed by the electronic control unit 50 at a predetermined cycle.

As shown in FIG. 5, in the series of processes, first, it is determined whether or not learning for correction of the fuel injection amount has been completed (step 100). That is, it is determined whether or not the learning correction amount KG has been calculated in a present operating region and the feedback center of the air-fuel ratio in the feedback control of the air-fuel ratio matches the stoichiometric corresponding value.

If it is determined that the learning for correction of the fuel injection amount has been completed (i.e., YES in step 100), it is determined whether or not the feedback control of the air-fuel ratio is being performed (step 110). More specifically, it is determined whether or not the fuel injection amount (fuel injection time) is being controlled based on the aforementioned air-fuel ratio correction coefficient FAF. This is because the feedback control of the air-fuel ratio needs to be performed as a prerequisite for making the determination concerning deterioration of the oxygen sensor 44 based on the inversion cycle of the output of the oxygen sensor 44.

If it is determined that the feedback control of the air-fuel ratio is being performed (i.e., YES in step 110), the inversion cycle of the output of the oxygen sensor 44 is measured by the aforementioned processes (step 120).

If it is determined that the learning for correction of the fuel injection amount has not been completed (i.e., NO in step 100), or it is determined that the feedback control of the air-fuel ratio is not being performed (i.e., NO in step 110), the series of processes is finished. That is, since the prerequisite for making the determination concerning deterioration of the oxygen sensor 44 is not satisfied, the determination concerning deterioration of the oxygen sensor 44 is not made.

After the inversion cycle of the output of the oxygen sensor 44 is measured in this manner, the deterioration determining value is set based on the feedback center adjustment degree (step 130). More specifically, the deterioration determining value is set based on the adjustment of the feedback center of the air-fuel ratio, which is based on the skip correction amount RS of the air-fuel ratio correction coefficient FAF.

After the deterioration determining value is set based on the feedback center adjustment degree in this manner, it is determined whether or not the inversion cycle of the output of the oxygen sensor 44 is longer than the deterioration determining value (step 140). More specifically, it is determined whether or not the inversion cycle TC1 is longer than the deterioration determining value TR1 (TR1<TC1). That is, it is determined whether or not the inversion cycle TC1 is longer than the deterioration determining value TR1 since the oxygen sensor 44 has deteriorated and the response thereof has decreased.

If it is determined that the inversion cycle of the output of the oxygen sensor 44 is longer than the deterioration determining value (i.e., YES in step 140), it is determined that the oxygen sensor 44 has deteriorated (step 150). More specifically, the flag FOF indicating the result of the determination is set to "1". After it is determined that the oxygen sensor 44 has deteriorated in this manner, the series of processes is finished.

If it is determined that the inversion cycle of the output of the oxygen sensor is equal to or shorter than the deterioration determining value (i.e., NO in step 140), it is determined that the oxygen sensor 44 has not deteriorated (step 160). More specifically, the flag FOF indicating the result of the determination is set to "0". After it is determined that the oxygen sensor 44 has not deteriorated in this manner, the series of processes is finished.

As described above, according to the embodiment, the following effects can be obtained.

(1) When the response of the air-fuel ratio correction coefficient FAF with respect to the result of the output of the oxygen sensor 44 is changed, the deterioration determining value TR1 is accordingly changed. Thus, it is possible to appropriately adjust the deterioration determining value TR1 according to the change in the inversion cycle TC1 of the output of the oxygen sensor 44 due to the change in the response of the air-fuel ratio correction coefficient FAF. Therefore, the determination concerning deterioration of the oxygen sensor 44 can be made more appropriately.

(2) Since the deterioration determining value TR1 is set so as to be variable according to the feedback center adjustment degree CA, it is possible to appropriately adjust the deterioration determining value TR1 according to the change in the inversion cycle TC1 of the output of the oxygen sensor 44 due to the adjustment of the feedback center. Therefore, the determination concerning deterioration of the oxygen sensor 44 can be made more appropriately.

(3) When the feedback center is adjusted to a large extent, the difference between the rich period and the lean period of the output of the oxygen sensor becomes large, and the change in the inversion cycle TC1 becomes large. Therefore, the deterioration determining value TR1 is set such that the inversion cycle when it is determined that the oxygen sensor 44 has deteriorated is longer as the feedback center adjustment degree CA is larger, whereby the determination concerning deterioration of the oxygen sensor 44 can be made appropriately.

Second Embodiment

Hereinafter, a deterioration determining apparatus for an oxygen sensor according to a second embodiment of the invention will be described focusing the difference between the first embodiment and the second embodiment. As described above, when the integral correction amount KI of the air-fuel ratio correction coefficient FAF is set so as to be variable according to the intake air amount QA and the like, the inversion cycle of the output of the oxygen sensor 44 changes according to the set integral correction amount KI.

A relation between the integral correction amount KI and the output of the oxygen sensor 44 will be described with reference to FIG. 6. Description will be made of the case where the skip correction amount RS on the rich side and the skip correction amount RS on the lean side are symmetric, that is, the case where the feedback center of the feedback control of the air-fuel ratio matches the stoichiometric corresponding value FAFS, as an example.

Figure 6:
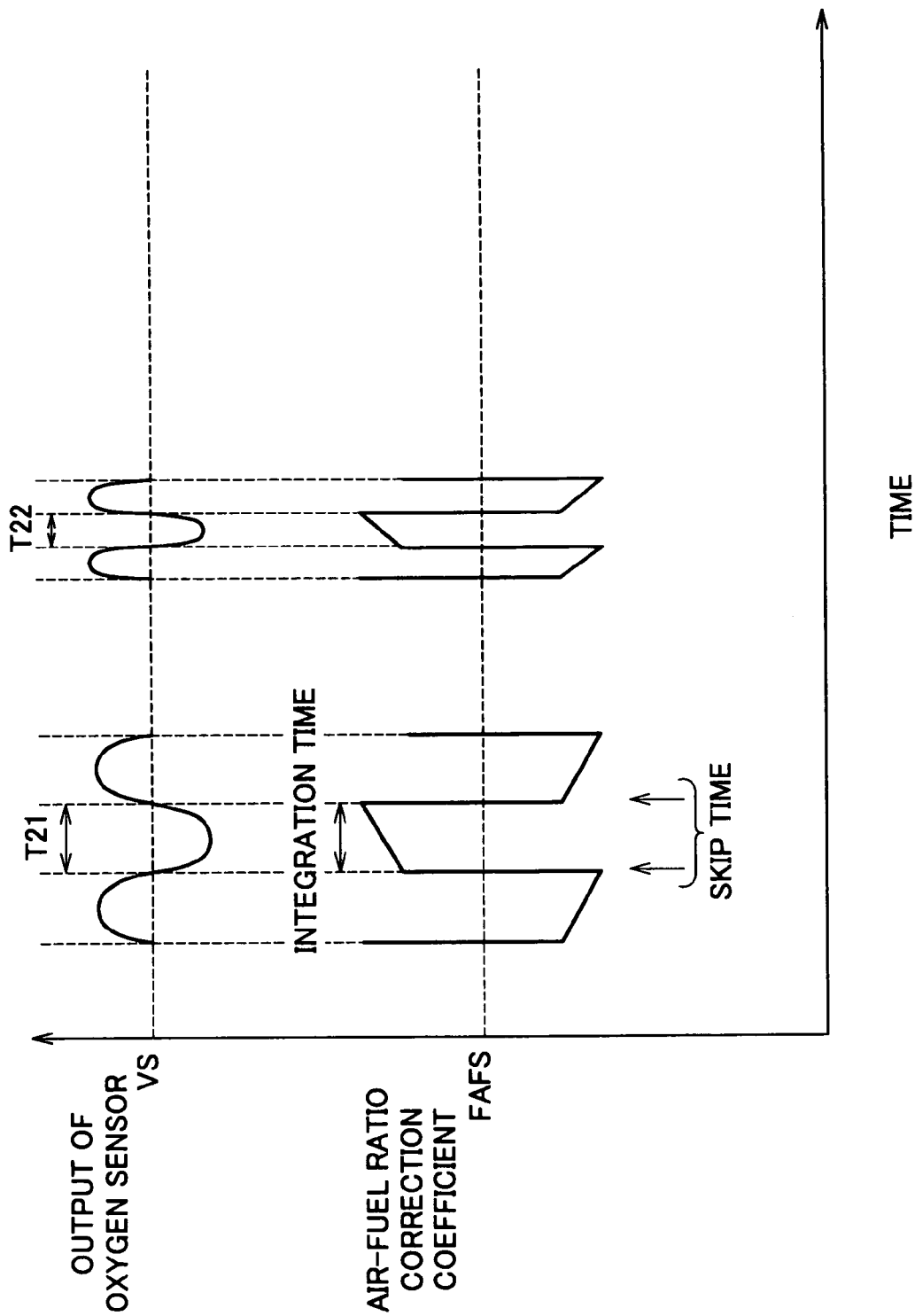
FIG. 6 is a timing chart showing the output of the oxygen sensor and a change in the air-fuel ratio correction coefficient in the deterioration determining apparatus for an oxygen according to the second embodiment.

As shown in FIG. 6, a time period T21 until the output of the oxygen sensor 44 is inverted in the case where the absolute value of the integral correction amount KI is small (as shown in a left side of a graph in FIG. 6) is longer than a time period T22 in the case where the absolute value of the integral correction amount KI is relatively large (as shown in a right side of the graph in FIG. 6) (i.e., T21>T22). That is, in the case where the absolute value of the integral correction amount KI is small, the speed at which the fuel injection amount is changed is low, and accordingly the speed at which the oxygen concentration of the exhaust gas is changed is low. On the other hand, in the case where the absolute value of the integral correction amount KI is large, the speed at which the fuel injection amount is changed is high, and accordingly the speed at which the oxygen concentration of the exhaust gas is changed is high. Therefore, the inversion cycle TC1 of the output of the oxygen sensor 44 varies according to the absolute value of the integral correction amount KI. As a result, the determination concerning deterioration of the oxygen sensor 44 may not be made appropriately.

Figure 7:
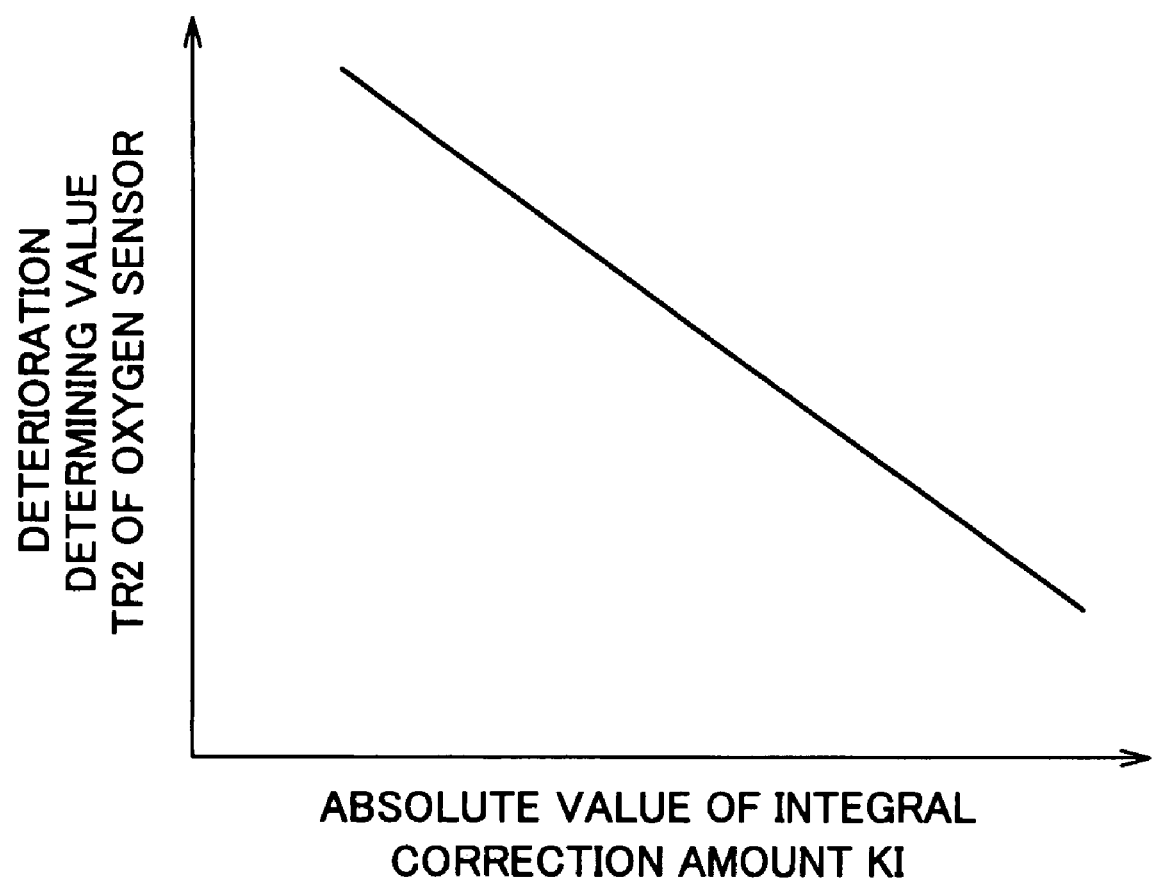
FIG. 7 is a map showing a relation between an absolute value of an integral correction amount and a deterioration determining value for the oxygen sensor according to the second embodiment of the invention.

Accordingly, in the embodiment, in step 130 in FIG. 5, a deterioration determining value TR2 is set so as to be variable according to the absolute value of the integral correction amount KI referring to the map shown in FIG. 7. As shown in FIG. 7, the deterioration determining value TR2 is set to a smaller value as the absolute value of the integral correction amount KI is larger. This is because as the absolute value of the integral correction amount KI is larger, the inversion cycle TC1 of the output of the oxygen sensor 44 tends to be shorter. Therefore, even when the absolute value of the integral correction amount KI increases, and the inversion cycle of the output of the oxygen sensor 44 decreases, the deterioration determining value TR2 is set to an appropriate value according to the increase in the absolute value of the integral correction amount KI and the decrease in the inversion cycle of the output of the oxygen sensor 44.

As described above, according to the second embodiment, the same effect as the effect described in (1) in the first embodiment can be obtained.

(4) The response of the air-fuel ratio correction coefficient FAF with respect to the result of the output of the oxygen sensor 44 can be changed by changing the integral correction amount KI. Accordingly, since the deterioration determining value TR2 is set based on the integral correction amount KI, it is possible to set the deterioration determining value TR2 to an appropriate value according to the change in the inversion cycle TC1 of the output of the oxygen sensor 44 due to the change in the response of the air-fuel ratio correction coefficient FAF.

Third Embodiment

Hereinafter, a deterioration determining apparatus for an oxygen sensor according to a third embodiment of the invention will be described focusing the difference between the first embodiment and the third embodiment. In the first embodiment, the determination is made based on a time period from when the output of the oxygen sensor is inverted until when the output of the oxygen sensor is inverted again (i.e., the inversion cycle). However, in the third embodiment, the determination is made based on a time period from when the air-fuel ratio correction coefficient is changed so as to cross the stoichiometric corresponding value until when the output of the oxygen sensor is inverted (i.e., a response time of the oxygen sensor).

Figure 8:
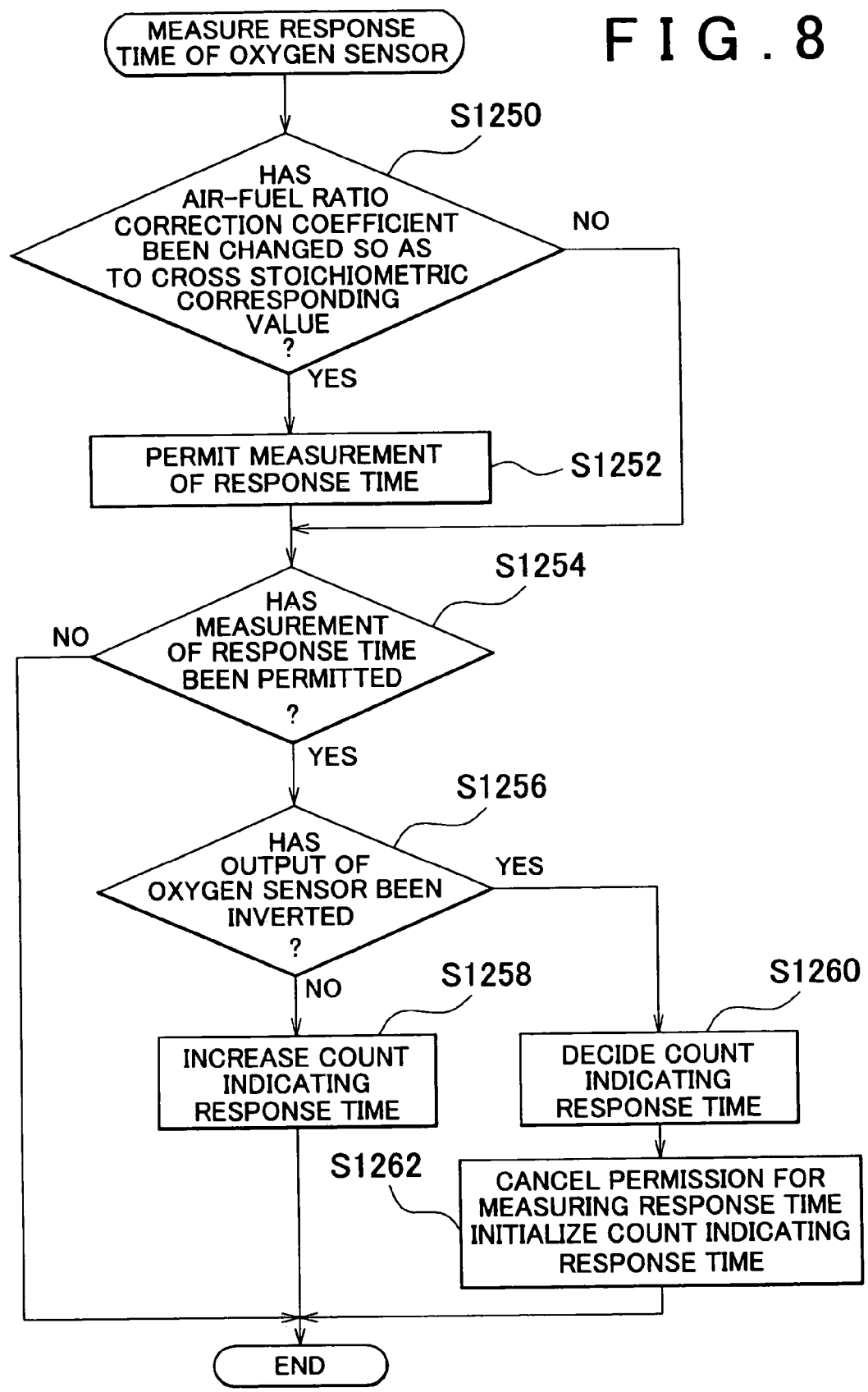
FIG. 8 is a flowchart showing a procedure for measuring a response time of the oxygen sensor in the deterioration determining apparatus for an oxygen sensor according to the third embodiment of the invention.

The determination concerning deterioration of the oxygen sensor, which is made by the deterioration determining apparatus for an oxygen sensor according to the embodiment, will be described with reference to FIG. 8 to FIG. 10. First, measurement of the response time of the oxygen sensor will be described in detail with reference to a flowchart in FIG. 8 and a graph in FIG. 9.

In the series of processes, first, it is determined whether or not the air-fuel ratio correction coefficient has been changed so as to cross the stoichiometric corresponding value (step 1250). More specifically, it is determined whether or not the value of the air-fuel ratio correction coefficient FAF has been changed from the value for increase correction to the value for decrease correction or from the value for decrease correction to the value for increase correction so as to cross the stoichiometric corresponding value FAFS.

More detailed description will be made with reference to the graph in FIG. 9. First, description will be made of the case where the skip correction amount RS on the rich side and the skip correction amount RS on the lean side are symmetric, that is, the case where the feedback center of the feedback control of the air-fuel ratio matches stoichiometric corresponding value FAFS (in the left side of the graph in FIG. 9).

In this case, as described above, when the skip correction amount RS is added to the air-fuel ratio correction coefficient FAF, it is determined that the value of the air-fuel ratio correction coefficient FAF is greatly changed from the value for increase correction to the value for decrease correction, or from the value for decrease correction to the value for increase correction so as to cross the stoichiometric corresponding value FAFS.

Next, description will be made of the case where the skip correction amount RS on the rich side and the skip correction amount RS on the lean side are asymmetric, that is, the case where the feedback center of the feedback control of the air-fuel ratio is deviated from the stoichiometric corresponding value FAFS.

In this case, as described above, even when the skip correction amount RS is added to the air-fuel ratio correction coefficient FAF, the decrease correction may not be changed to the increase correction (at time t31). Then, when the value of the air-fuel ratio correction coefficient FAF becomes equal to the stoichiometric corresponding value FAFS due to fine adjustment using the integral correction amount KI (at time t32), it is determined that the air-fuel ratio correction coefficient has changed so as to cross the stoichiometric corresponding value. That is, the response time of the oxygen sensor 44 starts to be measured at a time at which the correction of the fuel injection amount is actually changed from the increase correction to the decrease correction (i.e., at time t32).

If it is determined that the air-fuel ratio correction coefficient has changed so as to cross the stoichiometric corresponding value (i.e., YES in step 1250), the measurement of the response time of the oxygen sensor is permitted (step 1252). More specifically, a flag FFR indicating the result of the determination is set to "1". That is, since the air-fuel ratio correction coefficient has changed so as to cross the stoichiometric corresponding value, the flag FFR indicates that the condition for starting the aforementioned measurement of the response time of the oxygen sensor is satisfied.

If it is determined that the air-fuel ratio correction coefficient has not changed so as to cross the stoichiometric corresponding value (i.e., NO in step 1250), the aforementioned measurement is not permitted. More specifically, the value of the flag FFR is maintained at "0" so as to indicate that the condition for starting the aforementioned measurement is not satisfied. That is, during a time period from time t31 until time t32 in FIG. 9, even when the output of the oxygen sensor 44 is inverted, the measurement of the response time of the oxygen sensor 44 is not permitted since the value of the air-fuel ratio correction coefficient FAF is not changed from the value for decrease correction to the value for increase correction.

Subsequently, it is determined whether or not the measurement of the response time of the oxygen sensor has been permitted (step 1254). More specifically, it is determined that the flag FFR is set to "1". That is, it is determined whether or not the output of the oxygen sensor 44 has been inverted and the aforementioned measurement has been permitted (step 1252) or the measurement is being performed.

If it is determined that the measurement of the response of the oxygen sensor has not been permitted (i.e., NO in step 1254), the series of processes is finished.

If it is determined that the measurement of the response of the oxygen sensor has been permitted (i.e., YES in step 1254), it is determined whether or not the output of the oxygen sensor has been inverted (step 1256). More specifically, it is determined whether or not the output of the oxygen sensor 44 has been inverted from rich to lean or from lean to rich. That is, as shown in FIG. 9, it is determined whether or not the output of the oxygen sensor 44 has been inverted in response to the change in the correction of the fuel injection amount, accordingly in response to the change in the oxygen concentration of the exhaust gas after the air-fuel ratio correction coefficient is changed so as to cross the stoichiometric corresponding value (at time t32).

If it is determined that the output of the oxygen sensor has not been inverted again (i.e., NO in step 1256), the count indicating the response time of the oxygen sensor is increased (in step 1258). More specifically, the counter included in the electronic control unit 50 continues counting, whereby a response time TC2 of the oxygen sensor 44, which is converted into the count number of the counter, is measured. That is, during the period from time t32 until time t33 in FIG. 9, since the output of the oxygen sensor 44 has not been inverted, the measurement of the response time TC2 is continued. Thus, after the count indicating the response time of the oxygen sensor 44 is increased, the series of processes is finished.

If it is determined that the output of the oxygen sensor has been inverted (i.e., YES in step 1256), the count indicating the response time is decided (step 1260). More specifically, the counter finishes counting, and the response time TC2 of the oxygen sensor 44, which is converted into the count number of the counter, is decided. That is, since the output of the oxygen sensor 44 is inverted at time t33 in FIG. 9, for example, a time period T33 is measured for determining the response time TC2. In a case shown in the left side of the graph in FIG. 9, the response time of the oxygen sensor 44 is equal to the inversion cycle of the output of the oxygen sensor 44, and for example, a time period T31 is measured for determining the response time TC2 of the oxygen sensor 44.

After the count indicating the response time is decided in this manner, the permission for measuring the response time is cancelled, and the count indicating the response time is initialized (step 1262). More specifically, the flag FFR is set to "0", and the count number of the counter is reset to "0". After the permission for measuring the response time is cancelled in this manner, and the count indicating the response time is initialized, the series of processes is finished.

FIG. 10 is a flowchart showing a procedure for making a determination concerning deterioration of the oxygen sensor by the deterioration determining apparatus for an oxygen sensor. In the flowchart shown in FIG. 10, processes in steps denoted by the same reference numerals as in the flowchart in FIG. 5 are the same as in the flowchart in FIG. 5. Therefore, description thereof will be omitted. The series of processes shown in the flowchart is repeatedly performed by the electronic control unit 50 at a predetermined cycle.

As shown in FIG. 10, when it is determined that the feedback control of the air-fuel ratio is being performed (i.e., YES in step 110), the response time of the oxygen sensor is measured by the aforementioned processes (step 125).

If it is determined that learning for correction of the fuel injection amount has not been completed (i.e., NO in step 100), or if it is determined that the feedback control of the air-fuel ratio is not being performed (i.e., NO in step 110), the series of processes is finished.

After the response time of the oxygen sensor is measured in this manner, it is determined whether or not the response time of the oxygen sensor is longer than a deterioration determining value (step 145). More specifically, it is determined whether or not the response time TC2 is longer than a predetermined deterioration determining value TR3 (TR3<TC2). The deterioration determining value TR3 is set to a value which is, for example, 1.5 to 2.0 times the response time in a case where the oxygen sensor 44 is new. That is, the deterioration determining value TR3 is set such that it can be determined that the oxygen sensor 44 has deteriorated when the response time of the oxygen sensor 44 is longer than the deterioration determining value TR3.

As described above, according to the embodiment, the following effect can be obtained.

(5) Since the determination concerning deterioration of the oxygen sensor 44 is made based on the response delay time of the oxygen sensor 44 excluding influence of deviation of the feedback center on the inversion cycle TC1, the determination concerning deterioration of the oxygen sensor 44 can be made more appropriately.

The invention is not limited to the deterioration determining apparatus for an oxygen sensor in each of the aforementioned embodiments. The deterioration determining apparatus for an oxygen sensor according to the invention can be realized, for example, in the following embodiments which are obtained by appropriately modifying the aforementioned embodiments.

In the first embodiment, the deviation between the medium value of the air-fuel ratio correction coefficient FAF and the stoichiometric corresponding value FAFS is used as the feedback center adjustment degree in the air-fuel ratio control. Instead, for example, the ratio between the skip correction amount RS at the time of increase correction and the skip correction amount RS at the time of decrease correction may be used. That is, other parameters may be used as the feedback center adjustment degree in the air-fuel ratio control, as long as the parameters show deviation of the feedback center from the stoichiometric corresponding value FAFS.

Thus, the response of the air-fuel ratio correction coefficient FAF with respect to the output of the oxygen sensor 44 may be changed also by changing the skip correction amount RS. Accordingly, the deterioration determining value may be set based on the skip correction amount RS, whereby the deterioration determining value can be set to an appropriate value according to the change in the inversion cycle TC1 of the output of the oxygen sensor 44 due to the change in the response of the air-fuel ratio correction coefficient FAF.

In each of the first to third embodiments, as the inversion cycle of the output of the oxygen sensor 44 or the response time of the oxygen sensor 44, only one of the output of the oxygen sensor on the rich side and the output of the oxygen sensor 44 on the lean side is measured. However, the sum of the output of the oxygen sensor 44 on the rich side and the output of the oxygen sensor 44 on the lean side may be measured. Also, plural inversion cycles on the rich side and the lean side, or plural response times on the rich side and the lean side may be measured. In this manner, the determination can be made by evaluating both the response delay time when the output of the oxygen sensor 44 is inverted from lean to rich and the response delay time when the output of the oxygen sensor 44 is inverted from rich to lean at the same time. Thus, the determination concerning deterioration of the oxygen sensor can be made more appropriately.

In the first to third embodiments, the deterioration determining value TR1, TR2, or TR3 is used as it is when the determination concerning deterioration of the oxygen sensor is made. However, the deterioration determining value may be corrected according to the intake air amount. That is, since the inversion cycle of the output of the oxygen sensor 44 or the response time of the oxygen sensor 44 varies according to the intake air amount, the deterioration determining value TR1, TR2, or TR3 may be corrected according to the intake air amount, whereby the accuracy of the determination concerning deterioration can be improved.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A deterioration determining apparatus for an oxygen sensor, which is applied to an engine in which a feedback control of an air-fuel ratio is performed by calculating an air-fuel ratio correction coefficient based on an output of an oxygen sensor, and response of the air-fuel ratio correction coefficient with respect to the output of the oxygen sensor is set so as to be variable, comprising:
   a determining device which sets a deterioration determining value concerning a determination as to whether the oxygen sensor has deteriorated such that the deterioration determining value is variable according to the set response of the air-fuel ratio correction coefficient with respect to the output of the oxygen sensor, and makes the determination as to whether the oxygen sensor has deteriorated based on an inversion cycle of the output of the oxygen sensor and the deterioration determining value.

2. The deterioration determining apparatus for an oxygen sensor according to claim 1, wherein the response of the air-fuel ratio correction coefficient with respect to the output of the oxygen sensor is set by changing an integral correction amount of the air-fuel ratio correction coefficient, and the deterioration determining value is set so as to be variable according to the integral correction amount.

3. The deterioration determining apparatus for an oxygen sensor according to claim 1, wherein the response of the air-fuel ratio correction coefficient with respect to the output of the oxygen sensor is set by changing a skip correction amount of the air-fuel ratio correction coefficient, and the deterioration determining value is set so as to be variable according to the skip correction amount.

4. The deterioration determining apparatus for an oxygen sensor according to claim 1, wherein the deterioration determining value is set so as to be variable such that as the response of the air-fuel ratio coefficient with respect to the output of the oxygen sensor decreases, the inversion cycle when it is determined that the oxygen sensor has deteriorated increases.

5. A deterioration determining apparatus for an oxygen sensor, which is applied to an engine in which a feedback control of an air-fuel ratio is performed by calculating an air-fuel ratio correction coefficient based on an output of an oxygen sensor, and a feedback center of the air-fuel ratio correction coefficient is adjusted by making response of the air-fuel ratio correction coefficient with respect to the output of the oxygen sensor different between when it is detected that the air-fuel ratio is richer than a target air-fuel ratio based on the output of the oxygen sensor, and when it is detected that the air-fuel ratio is leaner than the target air-fuel ratio based on the output of the oxygen sensor, comprising:
   a determining device which sets a deterioration determining value concerning a determination as to whether the oxygen sensor has deteriorated such that the deterioration determining value is variable according to a degree of adjustment of the feedback center of the air-fuel ratio correction coefficient, and makes the determination as to whether the oxygen sensor has deteriorated based on an inversion cycle of the output of the oxygen sensor and the deterioration determining value.

6. The deterioration determining apparatus for an oxygen sensor according to claim 5, wherein the deterioration determining value is set so as to be variable such that as the degree of adjustment of the feedback center increases, the inversion cycle when it is determined that the oxygen sensor has deteriorated increases.

7. A deterioration determining method for an oxygen sensor, which is applied to an engine in which a feedback control of an air-fuel ratio is performed by calculating an air-fuel ratio correction coefficient based on an output of an oxygen sensor, and response of the air-fuel ratio correction coefficient with respect to the output of the oxygen sensor is set so as to be variable, comprising the steps of:
   setting a deterioration determining value concerning a determination as to whether the oxygen sensor has deteriorated such that the deterioration determining value is variable according to the set response of the air-fuel ratio correction coefficient with respect to the output of the oxygen sensor; and
   making the determination as to whether the oxygen sensor has deteriorated based on an inversion cycle of the output of the oxygen sensor and the deterioration determining value.

8. The deterioration determining method for an oxygen sensor according to claim 7, wherein the response of the air-fuel ratio correction coefficient with respect to the output of the oxygen sensor is set by changing an integral correction amount of the air-fuel ratio correction coefficient, and the deterioration determining value is set so as to be variable according to the integral correction amount.

9. The deterioration determining method for an oxygen sensor according to claim 7, wherein the response of the air-fuel ratio correction coefficient with respect to the output of the oxygen sensor is set by changing a skip correction amount of the air-fuel ratio correction coefficient, and the deterioration determining value is set so as to be variable according to the skip correction amount.

10. The deterioration determining apparatus for an oxygen sensor according to claim 7, wherein the deterioration determining value is set so as to be variable such that as the response of the air-fuel ratio coefficient with respect to the output of the oxygen sensor decreases, the inversion cycle when it is determined that the oxygen sensor has deteriorated increases.

11. A deterioration determining method for an oxygen sensor, which is applied to an engine in which a feedback control of an air-fuel ratio is performed by calculating an air-fuel ratio correction coefficient based on an output of an oxygen sensor, and a feedback center of the air-fuel ratio correction coefficient is adjusted by making response of the air-fuel ratio correction coefficient with respect to the output of the oxygen sensor different between when it is detected that the air-fuel ratio is richer than a target air-fuel ratio based on the output of the oxygen sensor, and when it is detected that the air-fuel ratio is leaner than the target air-fuel ratio based on the output of the oxygen sensor, comprising the steps of:

setting a deterioration determining value concerning a determination as to whether the oxygen sensor has deteriorated such that the deterioration determining value is variable according to a degree of adjustment of the feedback center of the air-fuel ratio correction coefficient; and making the determination as to whether the oxygen sensor has deteriorated based on an inversion cycle of the output of the oxygen sensor and the deterioration determining value.

12. The deterioration determining method for an oxygen sensor according to claim 11, wherein the deterioration determining value is set so as to be variable such that as the degree of adjustment of the feedback center increases, the inversion cycle when it is determined that the oxygen sensor has deteriorated increases.

* * * * *